(No Model.)

C. T. HILDEBRANDT.
DRIVING MECHANISM.

No. 604,754. Patented May 31, 1898.

Witnesses.
Wm. M. Rheem.
Nellie M. Kibben.

Inventor
Charles T. Hildebrandt,
By Bond Adams Pickard Jackson.
Atty's.

UNITED STATES PATENT OFFICE.

CHARLES T. HILDEBRANDT, OF DECATUR, ILLINOIS.

DRIVING MECHANISM.

SPECIFICATION forming part of Letters Patent No. 604,754, dated May 31, 1898.

Application filed July 23, 1896. Serial No. 600,223. (No model.)

*To all whom it may concern:*

Be it known that I, CHARLES T. HILDEBRANDT, a citizen of the United States, residing in Decatur, in the county of Macon and State of Illinois, have invented certain new and useful Improvements in Driving Mechanism, of which the following is a specification, reference being had to the accompanying drawings, in which—

Figure 1:
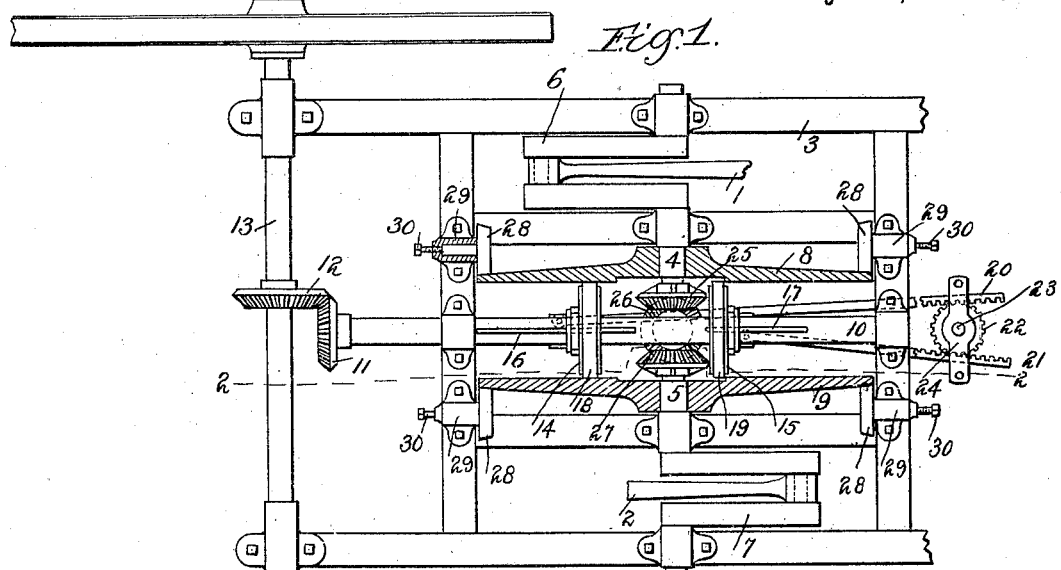
Figure 2:
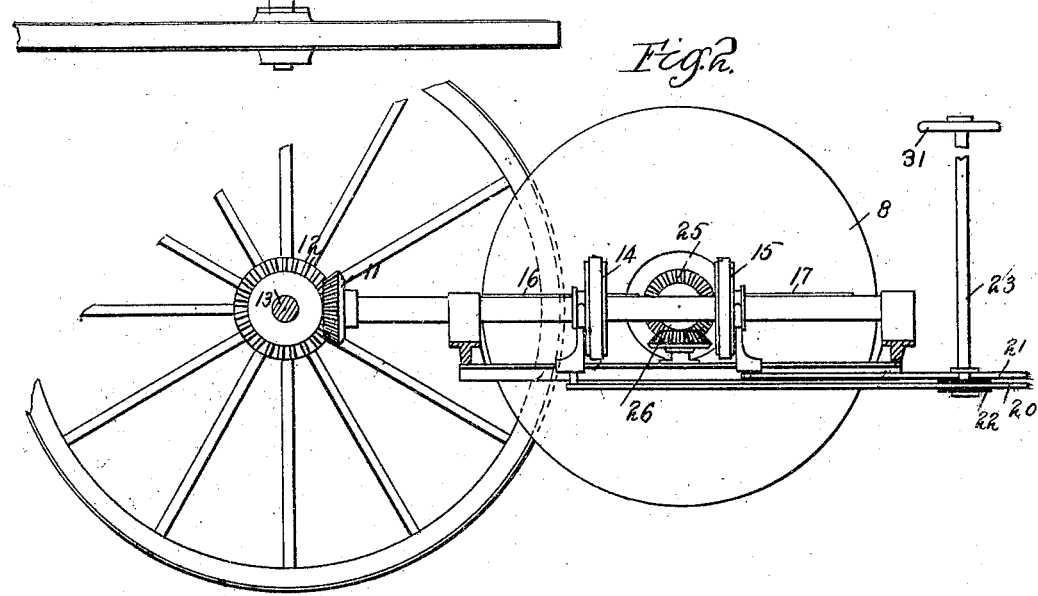

Figure 1 is a plan view, part being in section. Fig. 2 is a vertical section on line 2 2 of Fig. 1.

My invention relates to mechanism for transmitting power from a motor or other source of power to the wheels of a vehicle; and it has for its object to provide improved driving mechanism for this purpose which will permit of changing the speed of the vehicle without changing the speed of the motor and which will be an improvement upon driving mechanisms of this class in other respects to be hereinafter pointed out.

I accomplish the object of my invention as hereinafter specified and as illustrated in the drawings.

That which I regard as new will be set forth in the claims.

In the drawings, 3 indicates the frame of the machine, which may be part of a motor-carriage or other vehicle and is arranged to carry the parts of the driving mechanism.

4 5 indicate crank-shafts which are mounted at opposite sides of the frame in line with each other and are provided with cranks 6 7, as shown in Fig. 1. The motors or other sources of power are connected to the cranks 6 7 by pitmen 1 2. When two cranks are used, the crank-shafts 4 5 are oppositely arranged, as shown in Fig. 1, to make the machine work more smoothly. If desired, however, a single crank-shaft may be used, as will be hereinafter explained. Furthermore, instead of driving the main shaft by cranks and pitmen other suitable mechanism may be used. I have illustrated my improvement as applied to a machine having two crank-shafts, however, as I consider it the most desirable construction.

8 9 indicate disks having plane faces arranged opposite each other, said disks being mounted upon the inner ends of the shafts 4 5 and arranged a short distance apart. The disks 8 9 are keyed to their respective shafts, so that they rotate therewith.

10 indicates a shaft which extends longitudinally of the machine between the disks 8 9, said shaft having at its rear end a miter-gear 11, which meshes with a similar gear 12, mounted upon the axle 13 of the vehicle, as shown in Fig. 1, the arrangement being such that when the shaft 10 is rotated the vehicle will be propelled. The shaft 10 is supported in suitable bearings upon the frame of the machine, as shown.

14 15 indicate a pair of friction-wheels which are mounted upon feathers 16 17, respectively, extending longitudinally of the shaft 10, the wheels 14 15 being at opposite sides of the shafts 4 5. The wheels 14 15 are arranged to frictionally engage the disks 8 9, and to secure a better grip upon said disks the wheels 14 15 are provided with rawhide tires 18 19, as shown in Fig. 1.

By the construction described it will be understood that the wheels 14 15 rotate with the shaft 10, but are movable longitudinally thereof. In order to move the said wheels longitudinally, rack-bars 20 21 are provided, connected to the wheels 14 15, respectively, and extending to the front of the frame of the machine, where they are adapted to mesh with a pinion 22, mounted upon a vertically-arranged rod 23, which carries a hand-wheel 31 or other suitable device, so that it may be conveniently operated by the occupant of the vehicle. The rod 23 is vertically movable, and its lower end is held in place by a guide 24. As illustrated in Fig. 2, the racks 20 21 are in different planes, the rack 21 being uppermost, and by moving the rod 23 vertically the pinion 22 may be moved into mesh with either of the racks 20 21, as may be desired. When the pinion 22 is so moved into mesh, if the rod 23 be rotated the wheel 14 or 15, as the case may be, which is attached to the rack-bar operated, will be shifted along the shaft 10. The wheels 14 15 are made adjustable longitudinally of the shaft 10 for the purpose of moving the point of the engagement of such wheels with the disks 8 9 toward or from the center of such disks. As a point on the periphery of the disk 8 would move more rapidly than a point nearer the center, it is evident that by moving the wheel 14 away from the center of the disk it would be caused to rotate with increasing rapidity without changing the speed of the disk 8. The mechanism for adjusting the wheels 14 15 thus enables the occupant of the vehicle to control its speed as he desires. In like manner the direction of rotation of the axle may be changed, since the wheels 14 15 being at opposite sides of the axes of the disks if one of them causes a forward rotation of the shaft the other will cause a backward rotation thereof, and either of said wheels, as above described, may be thrown into operative position by moving the pinion 22 into engagement with the appropriate rack-bar and adjusting said rack-bar longitudinally.

The inner ends of the shafts 4 and 5 are geared together through the medium of bevel gears 25, 26, and 27, whereby the two disks 8 and 9 are caused to rotate in unison, and inasmuch as the two friction-disks are geared together and the friction-wheels are driven by both disks the latter may be operated by a single engine, with the result that the machine is balanced and less friction upon each of the disks is required than if one of the disks were driven and the other were merely an idler.

In the drawings I have illustrated two crank-shafts; but my invention is such that it is unnecessary to employ two crank-shafts, as a single one can be used, as hereinbefore stated.

28 indicates a series of beveled disks, which are mounted in suitable bearings 29, arranged in the frame of the machine and adjustable by means of set-screws 30. The disks 28 bear against the outer faces of the disks 8 9, as illustrated in Fig. 1, the outer faces of said disks being inclined, so that by adjusting the disks 28 they may be caused to press the edges of the disks 8 9 inward, thereby causing them to grip the wheels 14 15 more tightly. This adjustment also serves to take up wear when necessary.

As illustrated in Fig. 2, the inner portions of the disks 8 9—that is, those portions immediately adjacent to the bearings of said disks—are countersunk, so that by moving the wheels 14 15 inward until they lie opposite said countersunk portions they will be moved out of engagement with the disks 8 9 and consequently will cease to rotate.

It will be seen from the above description that by my improved driving mechanism the movements of the vehicle can be accurately and readily controlled entirely without regard to the motor or other source of power, all the movements—such as starting, stopping, backing, and increasing and diminishing speed—being effected by simply operating the hand-rod 23.

I do not wish to be limited to the specific details of construction which I have described, as it is obvious that many modifications may be made without departing from the spirit of my invention. While I have claimed my improvements as applied to the rotation of a traction-wheel, it will be understood that they may also be applied to rotating a shaft or for other analogous purposes, and I do not wish to be limited to their use in connection with traction-wheels alone.

That which I claim as my invention, and desire to secure by Letters Patent, is—

1. The combination with a traction-wheel, a friction-disk, and means for rotating said disk, of a shaft 10, a pair of wheels mounted thereon and bearing against said disk, racks for moving said latter disks, and a vertically-movable pinion adapted to be moved into engagement with said racks to adjust said latter wheels, substantially as described.

2. The combination with a traction-wheel, of a pair of friction-disks, means for rotating said disks, a wheel which bears against the opposite faces of said disks, means for driving said traction-wheel from said latter wheel, and beveled disks 28 for adjusting said disks toward and from each other, substantially as described.

3. The combination with a drive-disk, of a wheel which bears against one face of said disk and is driven thereby, and adjustable disks bearing against the outer face of said drive-disk near its periphery, substantially as described.

4. The combination with a drive-disk, of a wheel which bears against one face of said disk and is driven thereby, and beveled disks bearing against the outer face of said drive-disk near its periphery, said beveled disks being adjustable radially of said drive-disk, substantially as described.

5. The combination with a traction-wheel, of two friction-disks geared together, means for rotating said disks, an interposed wheel bearing against the inner faces of said disks, independent devices bearing against the outer faces of said disks near their peripheries for adjusting said disks toward each other, and means for driving the traction-wheel from said interposed wheel, substantially as described.

CHARLES T. HILDEBRANDT.

Witnesses:
FRANK R. McMULLIN,
JOHN L. JACKSON.